(12) United States Patent
Fujita et al.

(10) Patent No.: US 10,066,085 B2
(45) Date of Patent: Sep. 4, 2018

(54) COMPOSITE MOLDING MATERIAL, INJECTION-MOLDED ARTICLE, AND METHOD FOR MANUFACTURING COMPOSITE MOLDING MATERIAL

(71) Applicant: Masanori Fujita, Tokyo (JP)

(72) Inventors: Masanori Fujita, Tokyo (JP); Toru Murakami, Tokyo (JP); Masaya Tsukamoto, Tokyo (JP)

(73) Assignee: Masanori Fujita, Tokyo (JP)

( * ) Notice: Subject to any disclaimer, the term of this patent is extended or adjusted under 35 U.S.C. 154(b) by 245 days.

(21) Appl. No.: 14/782,371

(22) PCT Filed: Mar. 18, 2014

(86) PCT No.: PCT/JP2014/057233
§ 371 (c)(1),
(2) Date: Oct. 5, 2015

(87) PCT Pub. No.: WO2014/167950
PCT Pub. Date: Oct. 16, 2014

(65) Prior Publication Data
US 2016/0053092 A1    Feb. 25, 2016

(30) Foreign Application Priority Data

Apr. 9, 2013    (JP) ................. 2013-081164

(51) Int. Cl.
*C08K 7/14* (2006.01)
*B29B 7/90* (2006.01)
(Continued)

(52) U.S. Cl.
CPC ............... *C08K 7/14* (2013.01); *B29B 7/90* (2013.01); *B29C 45/00* (2013.01);
(Continued)

(58) Field of Classification Search
CPC .... C08K 7/14; C08K 9/06; B29B 7/90; B29B 7/14; B29C 45/00; B29C 47/1009; C08L 101/00
See application file for complete search history.

(56) References Cited

U.S. PATENT DOCUMENTS

| | | |
|---|---|---|
| 4,124,730 A | 11/1978 | Albert et al. |
| 4,528,304 A | 7/1985 | Yoshimura et al. |

(Continued)

FOREIGN PATENT DOCUMENTS

| | | |
|---|---|---|
| CN | 101625447 A | 1/2010 |
| CN | 101760009 A | 6/2010 |

(Continued)

OTHER PUBLICATIONS

Machine translation of JP 03-101804. Apr. 1991.*
(Continued)

*Primary Examiner* — John E Uselding
(74) *Attorney, Agent, or Firm* — Li & Cai Intellectual Property (USA) Office (57) ABSTRACT

A composite molding material comprises a thermoplastic resin and reinforcing materials. The reinforcing materials are selected from a glass wool having an average fiber diameter of 1-7 μm and a pre-kneading fiber length of 300-1000 μm and a fibrous reinforcing material having an average fiber diameter of 7-20 μm. The glass wool and the fibrous reinforcing material are dispersed in the thermoplastic resin.

15 Claims, 7 Drawing Sheets

(51) Int. Cl.
  *B29C 45/00* (2006.01)
  *C08K 9/06* (2006.01)
  *C08L 101/00* (2006.01)
  *B29C 47/10* (2006.01)

(52) U.S. Cl.
  CPC ............ *B29C 47/1009* (2013.01); *C08K 9/06* (2013.01); *C08L 101/00* (2013.01); *B29C 45/0005* (2013.01)

(56) References Cited

U.S. PATENT DOCUMENTS 6,495,615 B1 * 12/2002 Gallucci .................. B29B 9/14
  428/391
6,525,126 B1 * 2/2003 Hattori .................. B01F 5/0473
  425/200

FOREIGN PATENT DOCUMENTS

| | | | |
|---|---|---|---|
| EP | 1826242 A1 | 8/2007 | |
| JP | 03-101804 | * 4/1991 | ............ B01D 39/20 |
| JP | 2010-024396 | 2/2010 | |
| JP | 2010-121108 A | 6/2010 | |
| KR | 10-2004-082930 A | 9/2004 | |
| WO | WO 2013/153443 | 10/2013 | |

OTHER PUBLICATIONS

European Patent Office, Extended European search report dated Jun. 10, 2016.
Korean Patent Office, Office action dated Jan. 29, 2017.

* cited by examiner

COMPOSITE MOLDING MATERIAL, INJECTION-MOLDED ARTICLE, AND METHOD FOR MANUFACTURING COMPOSITE MOLDING MATERIAL

BACKGROUND OF THE INVENTION

1. Field of the Invention

The present invention pertains to a composite molding material, an injection-molded article and a method for manufacturing a composite molding material, and in particular, pertains to a composite molding material in which a reinforcing material can be packed into an intricately shaped part of a mold during injection molding, an injection-molded article obtained by injection-molding the composite molding material, and a method for manufacturing a composite molding material.

2. Description of the Related Art

Plastics have been used for various purposes because they are lightweight. However, plastics have low elastic moduli and hence are not suitable as structure materials. Thus, when a plastic is combined with a material having a high elastic modulus such as glass fibers into a composite material, it is possible to use the composite material as a lightweight and high-strength material. In addition to glass fibers, carbon fibers, resin fibers having high strength, Kevlar, Dyneema, and the like are known as reinforcing materials for forming composite materials.

Such composite materials have been used in a wide range of fields such as mechanical mechanism parts, electrical parts, airplane parts, ship parts, automobile parts, office parts, building materials, fiber products, and sundry goods. However, if fibers are non-uniformly dispersed in a resin, inconvenience such as occurrence of warpage may occur during use of a product made from the composite material. Thus, it is important to uniformly disperse the fibers in the resin.

The method for mixing and dispersing fibers into a resin is generally divided into two types. One is a method in which fibers are infiltrated into a plastic while being oriented. The other is a method in which glass fibers are dispersed into a resin.

In the former method, the fibers are previously formed into a uniform mesh shape and then infiltrated into the plastic. Thus, it is possible to uniformly disperse the fibers into the resin. However, it is generally necessary to laminate a plurality of thin fiber layers such that their fiber directions are different from each other, and a procedure of laminating a fiber layer and curing a plastic is repeated. Thus, the manufacturing cost increases.

Meanwhile, the latter method has an advantage of improved productivity due to it being possible to manufacture the product through: (1) a two-staged process in which the reinforcing material is kneaded using an extruder into a thermoplastic resin which has been caused to melt by heating and pellets of a composite molding material is initially produced, and the pellets are then fed into an injection molding machine and kneaded by heating in the molding machine, and the resin is caused to melt, injected into a mold, and shaped; or (2) a one-staged process in which kneading and injection molding are sequentially performed.

Known reinforcing materials used in the latter method include glass fibers having an average fiber diameter of about 10 to 18 µm (see Patent Document 1) or 10 to 20 µm (see Patent Document 2). Chopped strands obtained by cutting, into predetermined lengths, glass fiber obtained by collecting 50 to 200 single fibers having the above diameters are ordinarily used.

It is known that the incidence of defective appearance can be reduced by using glass wool as a material for use as a reinforcing material other than chopped strands. Glass wool has been attracting attention in recent years because it can be produced from recycled glass, is resource-friendly, and exhibits excellent thermal insulation as a residential building material (see Patent Document 3).

The inventors also discovered that heating the glass wool when introduced into the thermoplastic resin results in the glass wool in the obtained composite molding material being less susceptible to being cut than when added without being heated, making it possible to disperse the glass wool in the thermoplastic resin with a consistently, relatively long fiber length, and have submitted a patent application (see Patent Document 4).

Ordinarily, when an injection-molded article is to be produced, a molten composite molding material is pressed into a mold via a packing orifice in the mold by applying pressure, and the composite molding material is packed throughout the mold and molded. In recent years, the structures of injection-molded articles produced by injection molding have become increasingly complex and intricate, and there is growing need to use injection molding to produce complex shapes such as a change in thickness in a part of the injection-molded article, a bend in a part of the injection-molded article, or an intricately shaped section such as a lattice-like section being provided to a part of the injection-molded article (a portion of an injection-molded article at which the thickness is different, a bend is present, or an intricately configured section is present may hereafter be referred to as an "intricately shaped part").

However, when a product including an intricately shaped part is produced by injection molding, and a reinforcing material having a relatively large average fiber diameter such as glass fiber is used, a problem is presented in that the portion of the mold corresponding to an intricately shaped part of the product has a complex shape such as a bend, preventing the glass fibers from readily entering the portion corresponding to the intricately shaped part and resulting in the injection-molded article having a reduced strength at the intricately shaped part. Meanwhile, using a reinforcing material having a relatively small average fiber diameter such as glass wool presents a problem in that although the strength of the intricately shaped part of the injection-molded article is improved, the strength of the injection-molded article as a whole is diminished. In addition, injection-molding a composite molding material that includes a reinforcing material having a relatively large average fiber diameter such as glass fiber into a mold including an intricately shaped part presents a problem of poor uniformity by which the reinforcing material is dispersed in the mold, resulting in a variation in strength between individual products and/or according to location even within a single product and diminished product yield.

Patent Document 1: JP-A 2009-7179
Patent Document 2: JP-A 2007-277391
Patent Document 3: JP-A 2011-183638
Patent Document 4: JP-A 2012-089067

SUMMARY OF THE INVENTION

The present invention was conceived in order to solve the above problem. It was newly discovered, as a result of extensive study, that producing a composite molding material using a thermoplastic resin and two or more fibrous reinforcing materials having different average fiber diameters and producing an injection-molded article using the composite molding material makes it possible to pack the reinforcing material having a smaller average fiber diameter into an intricately shaped part of a product to improve the strength of the intricately shaped part while maintaining the strength of the basic portion of the product.

An object of the present invention is to provide a composite molding material, an injection-molded article, and a method for manufacturing a composite molding material.

The present invention pertains to the following composite molding material, injection-molded article, and method for manufacturing a composite molding material.

(1) A composite molding material comprising: a thermoplastic resin; glass wool having an average fiber diameter of 1-7 μm and a pre-kneading fiber length of 300-1000 μm, the glass wool being a reinforcing material; and a fibrous reinforcing material having an average fiber diameter of 7-20 μm.

(2) The composite molding material according to (1) above, wherein the fibrous reinforcing material having an average fiber diameter of 7-20 μm is glass fiber.

(3) The composite molding material according to (1) or (2) above, wherein the glass wool has been surface-treated with at least one agent selected from silane coupling agents, lubricants, and coating-forming materials.

(4) The composite molding material according to (2) or (3) above, wherein the glass fiber has been surface-treated with at least one agent selected from silane coupling agents, lubricants, and coating-forming materials.

(5) A composite molding material comprising: a thermoplastic resin; glass wool having an average fiber diameter of 1-7 μm and a pre-kneading fiber length of 300-1000 μm, the glass wool being a reinforcing material; and a fibrous reinforcing material having an average fiber diameter of 7-20 μm, wherein, among the reinforcing materials, at least the glass wool is heated to a temperature that falls within the range of a temperature lower by 150° C. to a temperature higher by 50° C. than the temperature of the melted thermoplastic resin, and is then introduced into the melted thermoplastic resin.

(6) The composite molding material according to any of (1)-(5) above, wherein the composite molding material is one used for injection molding.

(7) An injection-molded article produced by injection molding the composite molding material according to any of (1)-(6) above.

(8) A method for manufacturing a composite molding material comprising: a thermoplastic resin; glass wool having an average fiber diameter of 1-7 μm and a pre-kneading fiber length of 300-1000 μm, the glass wool being a reinforcing material; and a fibrous reinforcing material having an average fiber diameter of 7-20 μm, wherein, among the reinforcing materials, at least the glass wool is heated to a temperature that falls within the range of a temperature lower by 150° C. to a temperature higher by 50° C. than the temperature of the melted thermoplastic resin, and is then introduced into the melted thermoplastic resin.

(9) The method for manufacturing a composite molding material according to (8) above, wherein the reinforcing material having an average fiber diameter of 7-20 μm is glass fiber.

Performing injection molding using the composite molding material of the present invention makes it possible to extend the packing of the reinforcing material to an intricately shaped part of an obtained injection-molded article. Therefore, it is possible to increase the strength of the intricately shaped part while maintaining the strength of the injection-molded article, and to efficiently produce, by injection molding, a product in which the structure is complex and strength is required of an intricately shaped part such as a small cooling fan or a semiconductor burn-in socket.

The composite molding material of the present invention contains two or more fibrous reinforcing materials having different average fiber diameters; i.e., if the reinforcing materials have the same mass, the proportion of the reinforcing material having the larger average fiber diameter can be reduced, making it possible to reduce the viscosity of the composite molding material during injection molding. It is therefore possible to reduce the pressure by which the molten composite molding material is pushed into a mold, reducing friction acting on the mold and improving durability.

Producing an injection-molded article using the composite molding material of the present invention improves the dispersion performance of the reinforcing material having the greater average fiber diameter, reducing the variation in strength between individual products and/or according to location within a single product and therefore making it possible to increase the product yield.

In addition, at least the reinforcing material having the lowest bulk density from among the two or more fibrous reinforcing materials having different average fiber diameters is heated to a temperature that falls within the range of a temperature lower by 150° C. to a temperature higher by 50° C. than the temperature of the melted thermoplastic resin; and then introduced into the melted thermoplastic resin, making it possible to maintain a long fiber length for the reinforcing material in the composite molding material and increase the strength of the injection-molded article in which the composite molding material is used.

DESCRIPTION OF THE PREFERRED EMBODIMENTS

The composite molding material, the injection-molded article, and the method for manufacturing a composite molding material according to the present invention will now be described in detail.

First, a thermoplastic resin forming the composite molding material according to the embodiment of the present invention is not particularly limited as long as it allows reinforcing material to be dispersed therein. Examples of the thermoplastic resin include existing thermoplastic resins, such as general-purpose plastics, engineering plastics, and super-engineering plastics. Specific examples of general-purpose plastics include polyethylene (PE), polypropylene (PP), polyvinyl chloride (PVC), polyvinylidene chloride, polystyrene (PS), polyvinyl acetate (PVAc), polytetrafluoroethylene (PTFE), acrylonitrile butadiene styrene resin (ABS resin), styrene-acrylonitrile copolymer (AS resin), and acrylic resin (PMMA). Specific examples of engineering plastics include polyimide (PA), typically, nylon, polyacetal (POM), polycarbonate (PC), modified polyphenylene ether (m-PPE, modified PPE, PPO), polybutylene terephthalate (PBT), polyethylene terephthalate (PET), syndiotactic polystyrene (SPS), and cyclic polyolefin (COP). Specific examples of super-engineering plastics include polyetherimide (PEI), polyphenylene sulfide (PPS), polytetrafluoroethylene (PTFE), polysulfone (PSF), polyethersulfone (PES), amorphous polyarylate (PAR), polyether ether ketone (PEEK), thermoplastic polyimide (PI), and polyamideimide (PAI). These resins may be used singly, or two or more of these resins may be used in combination.

Examples of the fibrous reinforcing material used in the present invention include glass fiber, glass wool, carbon fiber, cellulose fiber, aramid fiber, polyimide fiber, polyamide-imide fiber, heterocyclic high performance fiber, polyarylate fiber, Kevlar, Dyneema, potassium titanate fiber, and ceramic fiber (below, fibrous reinforcing materials may be referred to merely as "fiber(s)" or "reinforcing materials"). The composite molding material of the present invention contains at least two reinforcing materials having different average fiber diameters; the reinforcing materials may be selected as appropriate according to the shape of the intended injection-molded article. For the composite molding material of the present invention, a filler such as quartz, silica, talc, calcium oxide, magnesium hydroxide, or aluminum hydroxide may be added as required in addition to the two or more reinforcing materials having different average fiber diameters.

In the present invention, a "reinforcing material" signifies an aggregation of a selected reinforcing material and does not signify individual fibers included in the reinforcing material. In addition, in the present invention, it is necessary only for the average fiber diameters of at least two selected reinforcing materials to differ, there being no problem presented even if the individual fiber diameters of the two selected reinforcing materials partially overlap due to a variation in the diameters of individual fibers included in the reinforcing material. In addition, in the present invention, the two or more reinforcing materials having different average fiber diameters may be fibers made of different materials, or may be fibers made of the same material; e.g., glass fibers or glass wool, having different average fiber diameters, as long as the average fiber diameters of the reinforcing materials differ.

Having two or more reinforcing materials having different average fiber diameters contained in the composite molding material of the present invention makes it possible to increase the strength of an intricately shaped part of an injection-molded article, due to the fact that a reinforcing material having a smaller average fiber diameter can be more readily packed in the intricately shaped part of the injection-molded article than a reinforcing material having a larger average fiber diameter, while maintaining the strength of the injection-molded article. As described above, the effect of the present invention can be achieved as long as the average fiber diameters of the reinforcing materials differ; however, because there is a need to maintain the strength of the injection-molded article, it is preferable that the composite molding material contains a reinforcing material having an average fiber diameter of, e.g., 7 to 20 μm, or more preferably, 10 to 18 μm. An average fiber diameter greater than 20 μm is undesirable due to increased roughness of the surface of the injection-molded article and lower fluidity of the composite molding material increasing the pressure necessary to press the composite molding material into the mold during injection molding, making the mold more susceptible to wear. In addition, because it is preferable that a reinforcing material can be packed into the intricately shaped part of an injection-molded article, the composite molding material preferably contains a reinforcing material having an average fiber diameter of, e.g., 1 to 7 μm, and more preferably about 3 to 4 μm. An average fiber diameter of the reinforcing material less than 1 μm is undesirable due to a significant increase in manufacturing cost, an increase in bulk density of the fiber which makes it more difficult to knead the fiber into the thermoplastic resin, and a greater likelihood of the fiber being cut during production of the composite molding material and/or during injection molding, diminishing the strength of the injection-molded article. If a reinforcing material is to be further added in addition to the reinforcing materials having different average fiber diameters, there are no particular restrictions as long as the reinforcing material has an average fiber diameter of 1 to 20 μm. The reinforcing material to be added may be selected as appropriate according to whether the strength of the injection-molded article itself or an intricately shaped part is to be improved. Examples of reinforcing materials satisfying the average fiber diameter combination mentioned above include the following combinations: glass wool/glass fiber, glass wool/carbon fiber, ceramic fiber/glass fiber, potassium titanate fiber/glass fiber, glass wool/Kevlar, glass wool/polyimide fiber, glass wool/glass fiber/carbon fiber, glass wool/glass fiber/ceramic fiber, glass wool/glass fiber/potassium titanate fiber, glass wool/glass fiber/Kevlar, and glass wool/glass fiber/polyimide fiber.

There are no particular restrictions on the above reinforcing material as long as the material can be ordinarily manufactured or obtained in this technical field. For example, for the glass fiber, chopped strands obtained by cutting, into predetermined lengths, glass fiber obtained by collecting 50 to 200 single fibers having an average fiber diameter of 7 to 20 µm may be used. For the glass wool, cotton-like glass fiber having an average fiber diameter of approximately 1 to 7 µm and a fiber length of about 300 to 1000 µm may be used. For the carbon fiber, single-fiber filaments of a PAN-based carbon fiber having an average fiber diameter of 5 to 7 µm or single-fiber filaments of a pitch-based carbon fiber having an average fiber diameter of 7 to 10 µm may be used. For the ceramic fiber, amorphous alumina silica fiber (RCF) having an average fiber diameter of 2 to 4 µm or crystalline fiber (AF) having an average fiber diameter of 2 to 5 µm may be used. For the potassium titanate fiber, fiber having an average fiber diameter of about 1 to 2 µm may be used. The above examples indicate the average fiber diameters that are commonly used. For fibers such as cellulose fiber, aramid fiber, polyimide fibers, polyamide-imide fibers, heterocyclic high performance fiber, polyarylate fiber, Kevlar, and Dyneema, in addition to the fibers set out in the above examples, the average fiber diameter can be adjusted by adjusting the manufacturing process.

In a case in which an inorganic reinforcing material such as glass fiber, glass wool, ceramic fiber, or carbon fiber is used as a reinforcing material, because a thermoplastic resin is an organic material, simply dispersing the inorganic reinforcing material in the thermoplastic resin results in poor adhesion between the inorganic reinforcing material and the thermoplastic resin. Therefore, it is preferable that the inorganic reinforcing material is surface-treated by a silane coupling agent before being dispersed in the thermoplastic resin.

The silane coupling agent is not particularly limited, and may be determined in consideration of reactivity with the thermoplastic resin forming the composite molding material, thermal stability, and the like. Examples of the silane coupling agent include an amino silane-based coupling agent, an epoxy silane-based coupling agent, an allyl silane-based coupling agent, and a vinyl silane-based coupling agent. Commercially available products such as Z series manufactured by Dow Corning Toray Co., Ltd., KBM series and KBE series manufactured by Shin-Etsu Chemical Co., Ltd., and products manufactured by JNC Corporation may be used as these silane coupling agents.

It is possible to conduct surface treatment on the inorganic reinforcing material by dissolving the above silane coupling agent in a solvent, spraying the solution to the inorganic reinforcing material, and drying the inorganic reinforcing material. The weight percentage of the silane coupling agent to the inorganic reinforcing material may be 0.1 to 2.0 wt %, may be 0.15 to 0.4 wt %, and further may be 0.24 wt %.

In the embodiment of the present invention, the inorganic reinforcing material may be surface-treated with a lubricant. The lubricant is not particularly limited as long as it improves slip of the inorganic reinforcing material to allow the inorganic reinforcing material to be easily dispersed in the thermoplastic resin when the inorganic reinforcing material is kneaded into the thermoplastic resin. A generally used lubricant such as silicon oil may be used. In addition, a calixarene may be used. Since silicon is oil, silicon has poor affinity with the thermoplastic resin. However, since the calixarene is a phenol resin, the calixarene improves slip of the inorganic reinforcing material. In addition, since the calixarene has excellent affinity with the thermoplastic resin, the calixarene allows the added amount of the inorganic reinforcing material in the composite molding material to be increased while the fiber length of the inorganic reinforcing material is kept.

The calixarene is a cyclic oligomer in which a plurality (for example, in the range of 4 to 8) of phenol units or resorcin units are bonded in a circular pattern. Examples of tetramers include a resorcin cyclic tetramer represented by the following formula (1).

[Chemical formula 1]

(wherein $R_1$ denotes a hydroxyl group, and $R_2$ denotes a linear alkyl group or phenyl group having 1 to 17 carbon atoms.)

In a method for manufacturing the calixarene represented by the above formula (1), resorcinol or a resorcinol derivative is caused to react with an aldehyde compound (paraformaldehyde or paraldehyde) at a predetermined mole ratio in the presence of hydrochloric acid in an ethanol or acetic acid solvent or a sulfuric acid catalyst at a predetermined temperature for several hours, whereby it is possible to synthesize a cyclic compound and a linear compound. Isolation from the synthesized products is conducted by recrystallization with methanol or the like, whereby it is possible to obtain only the calixarene. For example, a reaction shown in the following formula (2) is exemplified, and it is possible to isolate and obtain only the calixarene from the products.

[Chemical formula 2]

(wherein $R_3$ denotes $C_{10}H_{21}$.)

In such a method for manufacturing the calixarene, when the mole ratios of the resorcinol derivative and the aldehyde compound are made equal to each other, the calixarene may be obtained. If the amount of the aldehyde compound increases, there is a possibility that a linear product or a branched product is preferentially synthesized.

In addition, examples of hexamers include p-polyhydroxy calix[6]arene represented by the following formula (3).

[Chemical formula 3]

(3)

It is possible to synthesize the above p-polyhydroxy calix[6]arene by, for example, a procedure of the following formula (4), and the details thereof are described in Macromolecules 2005, 38, 6871-6875.

[Chemical formula 4]

(4)

p-Hydroxycalix[6]arene HO[6]

A solvent for dissolving the synthesized calixarene is not particularly limited as long as it is possible to dissolve the calixarene. Examples of the solvent include methanol, ethanol, acetone, tetrahydrofuran (THF), chloroform, dimethyl sulfoxide (DMSO), diethylene glycol (DEG), diglyme, triglyme, dioxane, methyl isobutyl ketone, methyl t-butyl ether, polyethylene glycol, toluene, xylene, methylene chloride, and diethyl ether.

The inorganic reinforcing material is surface treated by being sprayed with a solution in which calixarene is dissolved, and dried.

The solution in which the calixarene is dissolved may be manufactured by the above manufacturing method, but for example, a plastic modifier nanodaX (registered trademark) manufactured by NANODAX CO., Ltd. may be used. The weight percentage of the plastic modifier nanodaX (registered trademark) with respect to the inorganic reinforcing material may be 0.001 to 0.5 wt % and may be 0.01 to 0.3 wt %.

The inorganic reinforcing material may be treated with the above silane coupling agent or lubricant or may be treated with the silane coupling agent and the lubricant.

In addition to the surface treatment with the above silane coupling agent and/or the above lubricant, the inorganic reinforcing material according to the embodiment of the present invention may be surface-treated with a publicly-known film-forming agent such as epoxy resin, vinyl acetate resin, vinyl acetate copolymer resin, urethane resin, or acrylic resin. These film-forming agents may be used singly, or two or more of these film-forming agents may be mixed and used. The weight percentage of the film-forming agent may be 5 to 15 times as large as that of the silane coupling agent.

The above surface treatment of the inorganic reinforcing material may be conducted before the inorganic reinforcing material is kneaded with the thermoplastic resin. Inorganic reinforcing material that have been surface-treated only with a lubricant may be prepared, and may be surface-treated with a desired silane coupling agent before being kneaded, depending on the thermoplastic resin to be used. Alternatively, the inorganic reinforcing material may be surface-treated With a lubricant and a silane coupling agent in advance, and further may be treated with a film-forming agent in advance according to need.

Additives such as publicly-known ultraviolet absorber, stabilizer, antioxidant, plasticizer, coloring agent, color adjusting agent, fire retardant, antistatic agent, fluorescent brightener, flatting agent, and impact strength modifier may be blended in the composite molding material according to the embodiment of the present invention.

The composite molding material of the present invention can be manufactured by using a single- or multi-screw extruder, kneader, mixing roll, Banbury mixer, or another well-known melt-kneader to cause a thermoplastic resin, two or more reinforcing materials which have different average fiber diameters and which have been surface-treated as required, and additives added as required to be melt-kneaded at a temperature of 200 to 400° C. No particular restrictions exist with regards to the manufacturing device. However, performing melt-kneading using a twin-screw extruder is preferred for simplicity. The kneaded composite molding material may be directly injection-molded in a mold or pelletized beforehand. The composite molding material of the present invention may be produced by initially producing a plurality of types of pellets containing only one reinforcing material, and combining, melting, and mixing pellets containing reinforcing materials having different average fiber diameters, or by combining and dry-blending pellets containing reinforcing materials having different average fiber diameters. It is alternatively possible to initially produce pellets containing at least one type of reinforcing material, melt the pellets, then add a reinforcing material having a different average fiber diameter and perform kneading.

If a reinforcing material having a small diameter and a low bulk density such as glass wool is used, the reinforcing material having the lowest bulk density, at least, may be added to the melted thermoplastic resin after being heated. For example, in the case of glass wool, the apparent volume of the glass wool is approximately 20 times greater than that of the thermoplastic resin of equal weight, indicating a large amount of air being contained. As a result, when the glass wool is successively introduced into the melted thermoplastic resin, only the portions of the thermoplastic resin in contact with the introduced glass wool are cooled by air held between the cotton-like glass wool, and the viscosity in these portions changes in relation to that of other portions of the thermoplastic resin. If the thermoplastic resin is kneaded in a state in which there is a variation in viscosity, the glass wool will be subjected to varying loads, increasing the likelihood of the glass wool being cut. Therefore, in order to prevent the viscosity of the thermoplastic resin from changing when the glass wool is introduced, it is preferable that the glass wool is heated in advance before being introduced. It shall be apparent that the reinforcing material to be heated in advance is not limited to that having the lowest bulk density; other reinforcing materials may be heated before being added.

The heating temperature of the inorganic reinforcing material may be set to a temperature that falls within the range of about a temperature lower by 150° C. to a temperature higher by 50° C. than the temperature of the melted thermoplastic resin. When the melting temperature of the thermoplastic resin is increased, the viscosity of the thermoplastic resin is decreased, and it becomes easy to disperse the inorganic reinforcing material. However, when the temperature of the thermoplastic resin is excessively increased, the properties of the thermoplastic resin may steeply change. Therefore, the embodiment of the present invention has such a feature that whereas the thermoplastic resin is melted at a temperature at which melting is ordinarily conducted in this field, the inorganic reinforcing material is heated. Although depending on the type of the used thermoplastic resin, the inorganic reinforcing material may be heated to about a temperature higher by 20° C. than the melting temperature of the thermoplastic resin, in order to avoid deterioration of the thermoplastic resin. On the other hand, the lower limit is not particularly limited since the effect is obtained as long as heating is conducted. The lower limit may be set to about a temperature lower by 100° C. and may be set to a temperature lower by 50° C., than the melting temperature of the thermoplastic resin. The inorganic reinforcing material may be heated to the same temperature as that of the melted resin.

No particular restrictions exist with regards to the configuration for heating the reinforcing material as long as the reinforcing material can be heated and introduced to the melted thermoplastic resin, such as heating means being provided to a hopper portion of a reinforcing material addition device of a kneading device. If a long fibrous reinforcing material such as glass fiber strands is used, the reinforcing material may be heated by being passed through a tube around which heating means is provided, and then introduced into the melted thermoplastic resin.

A reinforcing material in a composite molding material manufactured using the above method produces a smaller change in the viscosity of the thermoplastic resin during kneading, and the reinforcing material therefore does not readily cut. Therefore, the reinforcing material can be dispersed in the thermoplastic resin while maintaining a longer fiber length, making it possible to increase the strength of the composite molding material and improve the strength of the injection-molded article in which the composite molding material is used. Furthermore, if an inorganic reinforcing material is used, performing surface treatment using a lubricant, particularly, calixarene, results in a more-highly-lubricated inorganic reinforcing material. Therefore, it is possible to disperse a greater amount of the inorganic reinforcing material in the thermoplastic resin while further maintaining the fiber length of the inorganic reinforcing material.

In the composite molding material of the present invention, the blending ratio of all reinforcing materials in relation to the thermoplastic resin and the blending ratio between the reinforcing materials may be selected as appropriate according to factors such as the desired strength of the injection-molded article and the shape of the intricately shaped part of the injection-molded article.

The composite molding material of the present invention is particularly useful as a raw material for injection molding. The injection-molded article of the present invention can be applied in fields of, e.g., automotive vehicles, electrical and electronic engineering, generic machinery, and domestic electrical appliances.

Examples of applications in the field of automotive vehicles include radiator tanks, fans, vehicle fans such as radiator fans, fasteners, wheel caps, cylinder head covers, door handles, seat belt components, bumpers, valves, electrical components, and interior components.

Examples of applications in the field of electrical and electronic engineering include fans such as turbofans of a cooling module, evaluation jigs such as semiconductor burn-in sockets, connectors, reflectors, coil bobbins, switch components, signal cylinders, terminal platforms, and electrical products such as washing machines, refrigerators, vacuum cleaners, telephones, mobile telephones, televisions, personal computers, heating and cooling devices, illumination devices, fans, hot water dispensers, irons, and media players.

Other applications include: sash components; screws; gears; rack/pinion sets; bearings; shafts; springs; bearings, gears, resin casters, solid tires, or door rollers for a sliding component; and components of home electrical appliances and in the field of general machinery.

The above are typical examples of injection-molded articles. There are no particular restrictions as long as the article can be produced by injection molding, and other examples include resin molded articles, glass-substitute plastic products, resin components for aircraft interior, resin materials used in civil engineering, agricultural material products, fishing material products, vehicle components, railway carriage interior materials, resin articles and resin structures in ships, interior and exterior products, FRP resin products, industrial electrical components, automotive items, general resin containers, domestic kitchen items, resin boxes for clothing, resin cutlery and crockery, resin bottles, packaging material products, cleaning tools, tool boxes, leisure products, amusement devices, game items, pachinko machines, slot machines, solar cell-mounted devices, road signs, road safety items, fishing rods and fishing tools, resin decorative plates, wall sockets, OA device resin components, photocopier resin components, camera components, medical devices, stationary products, office devices and items, resin signpost materials, beauty and hairdressing tools and items, resin spectacle frames, gardening material products, resin synthetic turf, industrial resin valves, resin fasteners, resin packings, resin pipes, resin hoses, resin valves for water pipes, wire coating materials, resin nodule bands, resin bathtubs, resin tanks, duct pipe ropes, nets, windshields, resin pallets for cargo handling, resin containers, resin trays, and resin floor plates. Using the composite molding material of the present invention makes it possible to obtain an injection-molded article having improved added-value such as strength compared to conventional products.

The composite molding material of the present invention is particularly beneficial for injection-molding applications, but can also be used for applications other than injection molding such as press-molding of a sheet-shaped item.

Hereinafter, examples will be described to specifically describe the embodiment of the present invention. However, the examples are provided for explaining the embodiment of the present invention and for reference of its specific modes. These illustrative examples are intended to explain the specific modes of the embodiment of the present invention, but not intended to limit or restrict the scope of the claims disclosed in this application.

EMBODIMENT

[Production of Composite Molding Material]
(Production of Glass Wool 1)

First, glass wool (average fiber diameter: approximately 3.6 μm) manufactured by centrifugation was surface-treated by being sprayed with a solution containing a silane coupling agent and a coating-forming agent from a binder spray nozzle. Epoxy silane coupling agent Z4060 (Dow Corning Toray) was used for the silane coupling agent, and epoxy film former EM-058 (Adeka) was used for the coating-forming agent. The weight percentage in relation to the glass wool was 0.24 wt % for the epoxy silane coupling agent and 2.4 wt % for the coating-forming agent. The glass wool was then dried for one hour for 150° C. and then disintegration-treated to an average fiber diameter of 850 μm using a cutter mill.

(Production of Glass-Wool-1-Containing Pellets)

Using a co-directional twin-screw kneading extruder ZE40A ((Φ43, L/D=40), Berstorff) as an extruder and a weight-type screw feeder S210 (K-Tron) as a metering device, glass wool was added to molten polybutylene terephthalate (PBT, Polyplastics XFR4840) so that the ratio in the pellet represents 30 wt % and kneading was performed. Kneading was performed under the following conditions: screw speed: 120 rpm; resin pressure: 0.9 MPa; current: 36 A; and feed amount: 15 kg/hr. The resin temperature of the PBT during kneading was 250° C., and the glass wool was added at 25° C. After kneading, a strand (rod-shaped line) extruded from a die provided at the distal end of the barrel by rotation of a discharge disc of on screw is cooled by a strand bath and then cut with a strand cutter, and the glass-wool-1-containing pellets were produced.

Embodiment 1

The glass-wool-1-containing pellets produced using the above procedure and pellets (Nippon Polyplastics, 6840GF30) containing 30 wt % of glass fiber (average fiber diameter: 13 μm) were mixed at a 1:1 ratio and dry-blended using a tumbler for 10 minutes at a rotation speed of 30 rpm to produce a composite molding material.

First Comparative Example

The above pellets containing 30 wt % of the glass fiber (Nippon Polyplastics, 6840GF30) were used as the composite molding material of the first comparative example.

Second Comparative Example

The glass-wool-1-containing pellets produced above were used as the composite molding material of the second comparative example.

The reinforcing material contents of the composite molding materials of the first embodiment, the first comparative example, and the second comparative example is shown in Table 1.

TABLE 1

| | Reinforcing material content/wt % | |
|---|---|---|
| | Glass wool | Glass fiber |
| First embodiment | 15 | 15 |
| First comparative example | 0 | 30 |
| Second comparative example | 30 | 0 |

(Production of Glass Wool 2)

Glass wool 2 was produced using the same procedure as that used to produce the glass wool 1, except that an amino silane coupling agent S330 (Chisso Corporation) was used as a silane coupling agent, and a coating-forming agent was not used.

(Production of Glass-Wool-2-Containing Pellets)

Using a co-directional twin-screw kneading extruder BT-40-S2-36-L ((Φ39, L/D=36), Plastic Engineering Laboratory) as an extruder and a weight-type screw feeder S210 (K-Tron) as a metering device, glass wool was added to molten polyether imide (PEI, SABIC Innovative Plastics Ultem 1000) so that the ratio in the pellet represents 20 wt % and kneading was performed. The kneading was performed under the following conditions: screw rotation speed: 200 rpm; resin pressure: 0.6 MPa; current: 26 A to 27 A; and feed amount: 3.75 kg/hr. The resin temperature of the PEI during kneading was 380° C., and the glass wool was added at 25° C. After kneading, pellets were produced using the same procedure as that used for the glass-wool-1-containing pellets.

Second Embodiment

The produced glass-wool-2-containing pellets and pellets (SABIC Innovative Plastics, Ultem 2200) containing 20 wt % of glass fiber (average fiber diameter: 13 μm) were mixed at a 1:1 ratio and dry-blended using a tumbler for 10 minutes at a rotation speed of 30 rpm to produce a composite molding material.

Third Comparative Example

Pellets containing 20 wt % of the glass fiber (SABIC Innovative Plastics, Ultem 2200) were used as the third comparative example.

Table 2 shows the reinforcing material content of the composite molding materials in the second embodiment and the third comparative example.

TABLE 2

|  | Reinforcing material content/wt % | |
| --- | --- | --- |
|  | Glass wool | Glass fiber |
| Second embodiment | 10 | 10 |
| Third comparative example | 0 | 20 |

Production and Evaluation of Injection-Molded Article

Third Embodiment

<Production of Turbofan for Cooling Module)

Figure 1:
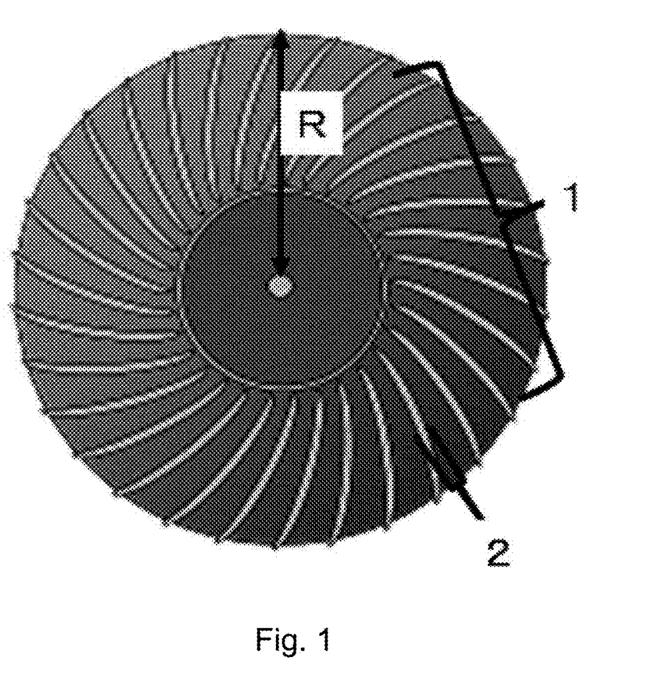
FIG. 1 is a schematic diagram showing a turbofan of a cooling module produced as a third embodiment.

The composite molding material produced in the first embodiment was injection-molded into a mold for manufacturing a turbofan (may hereafter be referred to simply as "fan") for a cooling module shaped as shown in FIG. 1. The injection molding machine used was model HXF33J8 of Ning Bo Hai Xing Plastics Machinery Manufacturing Co., Ltd). The injection molding conditions were such that the injection cylinder nozzle temperature when a composite molding material is packed in a mold was 265° C., the injection pressure was 100 MPa, the injection speed was 55/mm s-1, and the holding pressure was 80 MPa. The obtained fan had a radius R of 23 mm, the portion 1 at which blades are formed (i.e., the height of the fan as a whole) was 9 mm, and the individual blades had a thickness 2 of approximately 0.5 mm.

[Breaking Strength Testing of Turbofan for Cooling Module]

Figure 2:
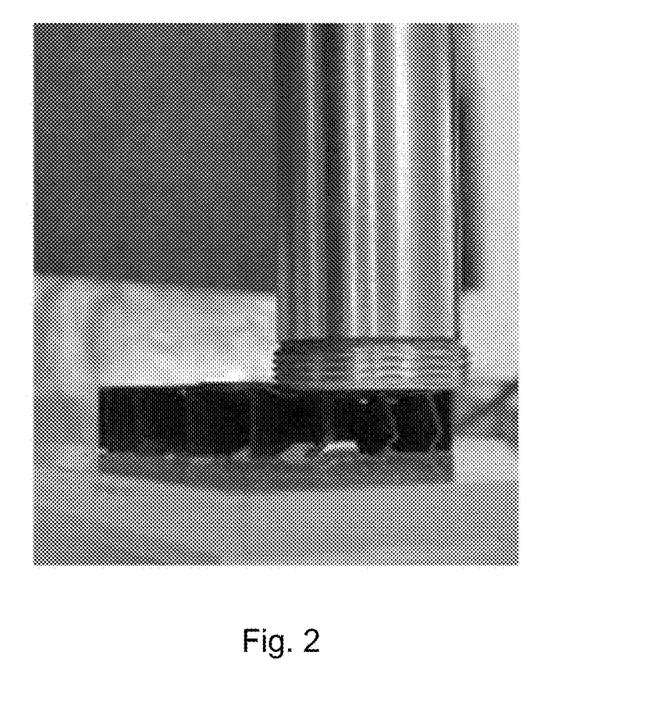
FIG. 2 is a photograph substituted for a drawing and shows a load being applied to a fan using a jig of a testing machine in a breaking strength test performed on the turbofan of the cooling module produced in the third embodiment.

Next, breaking strength testing was performed on the fan produced in the third embodiment. FIG. 2 is a photograph showing a load being applied to the fan using a jig of a testing machine. The testing machine was a universal testing machine model AG-1 manufactured by Shimadzu Corporation, and breaking strength testing was performed using a circular breaking jig having a diameter of 20 mm and under the condition of a head speed of 1.0 mm/min. The breaking strength of the fan was evaluated through the greatest load reached when a load is applied to an outer edge portion of the fan (i.e., maximum point test force (N)). Six fans produced under the same conditions were used for the evaluation.

[Blade Bending Test]

Figure 3:
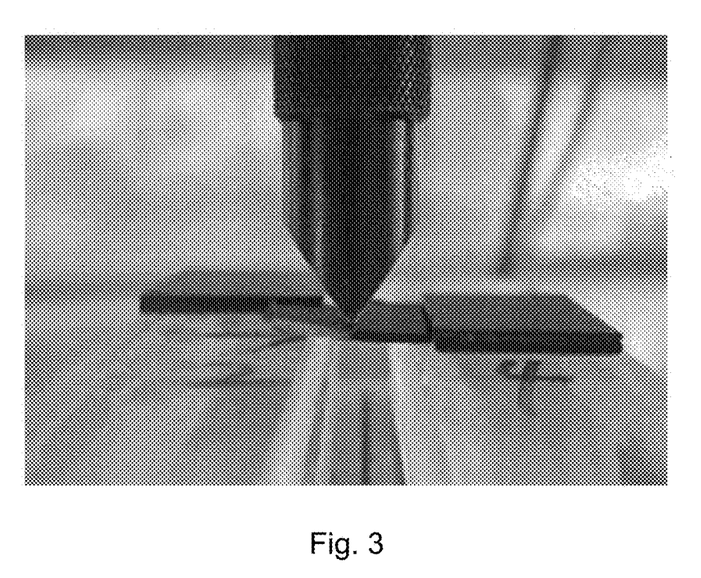
FIG. 3 is a photograph substituted for a drawing and shows a load being applied, using a jig of a testing machine, to a blade cut out from the turbofan of the cooling module produced in the third embodiment in a bending test performed on the blade.

Next, blades were cut out from the fan produced in the third embodiment, and bending testing was performed on individual blades. FIG. 3 is a photograph showing a load being applied to the blades using the jig of the testing machine. For the testing machine, a universal testing machine model AG-1 manufactured by Shimadzu Corporation was used, and the bending testing was performed using a minus-type bending jig under conditions of a fulcrum distance of 6.0 mm and a head speed of 1.0 mm/min. The bending strength of the blades was evaluated through the greatest load reached when a load is applied to a position 5 mm inward from an outer peripheral part of the blade (i.e., maximum point test force (N)). 19 blades cut out from the same fan were used for the evaluation.

Comparative Example 4

A fan was injection-molded and breaking strength testing and blade bending test were performed as with the third embodiment, except that the temperature of the injection cylinder nozzle was set to 275° C., the injection pressure was set to 115 MPa, and the holding pressure was set to 120 MPa, using the composite molding material of the first comparative example.

Comparative Example 5

A fan was injection-molded and breaking strength testing and blade bending test were performed as with the third embodiment, except that the holding pressure was set to 60 MPa, using the composite molding material of the second comparative example.

Figure 4:
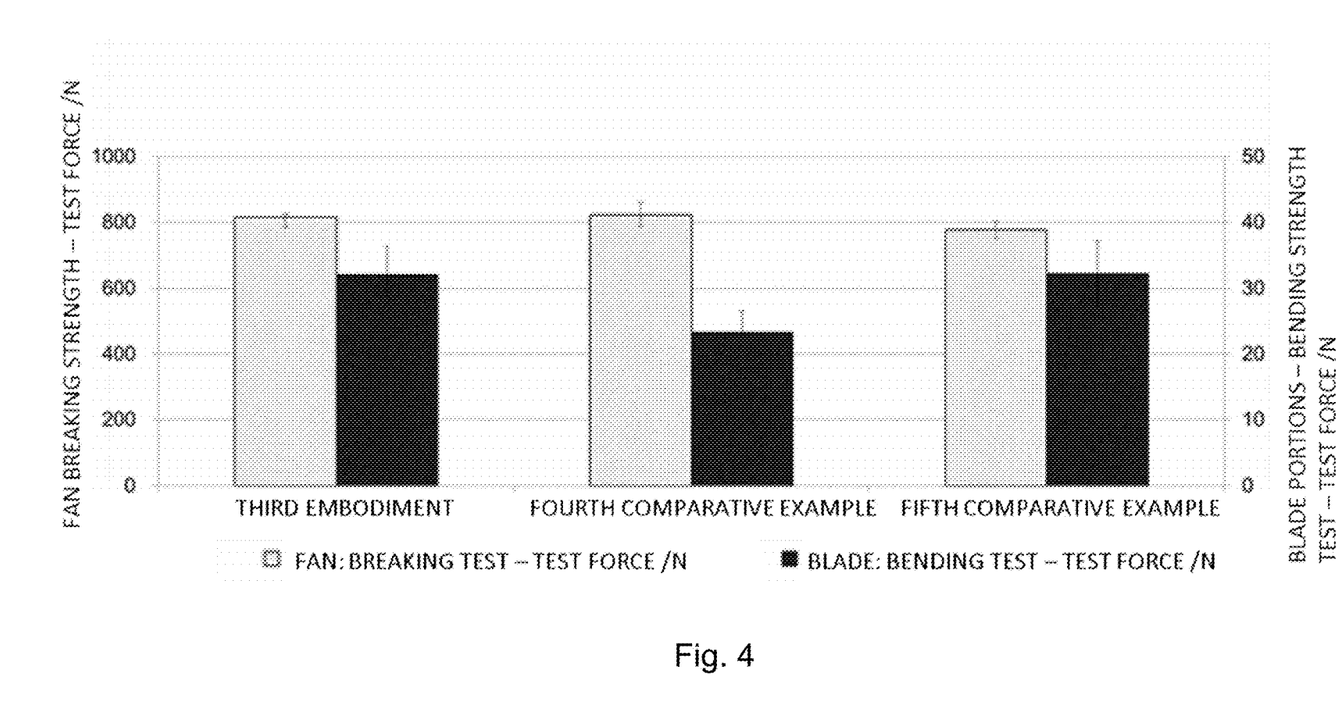
FIG. 4 is a graph showing the results of a breaking strength test and a bending test performed on a blade cut out from the turbofan of the cooling modules produced in the third embodiment, fourth comparative example, and fifth comparative example.

Table 3 and FIG. 4 show results of the breaking strength testing performed on the fans, and bending strength testing performed on blades cut out from the fans, produced in the third embodiment and the fourth and fifth comparative examples.

TABLE 3

|  | Fan breaking strength test - test force (N) | | | | Blade bending test - test force (N) | | | |
| --- | --- | --- | --- | --- | --- | --- | --- | --- |
|  | Average (from 6) | Maximum value | Minimum value | Standard deviation | Average (from 19) | Maximum value | Minimum value | Standard deviation |
| Third embodiment | 815.5 | 825.5 | 783.5 | 16.0 | 32.1 | 36.3 | 28.8 | 2.3 |
| Fourth comparative example | 822.5 | 860.5 | 786.5 | 30.3 | 23.3 | 26.5 | 21.2 | 1.3 |
| Fifth comparative example | 776.4 | 801.0 | 751.0 | 17.0 | 32.3 | 37.1 | 27.2 | 2.9 |

As can be seen from table 3 and FIG. 4, the fan of the third embodiment produced by injection molding using the composite molding material of the first embodiment exhibited a strength near that of the fourth comparative example. The fan of the third embodiment had a glass fiber content half that of the fourth comparative example and a glass wool content half that of the fifth comparative example, and the overall reinforcing material content of the fan was the same between the third embodiment, the fourth comparative example, and the fifth comparative example. However, a clear synergetic effect was observed in mixing glass fiber and glass wool in terms of improvement to the fan strength. This is thought to be because, as can be seen from the standard deviation, in the fan containing only the glass fiber of the forth comparative example as a reinforcing material, the glass fiber does not readily disperse uniformly in the mold during injection molding, resulting in a variation in strength between individual products and/or according to location, whereas in the fan of the third embodiment, the glass fiber is uniformly dispersed in the mold, and the glass wools supplementing the space between the glass fibers, increasing the dispersibility of the glass fiber and the glass wool in the fan.

With regards to the bending strength of the blades, as can be seen from Table 3 and FIG. 4, the strength of the forth comparative example in which only glass fiber is contained is lower than that of the fifth comparative example in which only glass wool is contained. However, blades cut out from the fan of the third embodiment exhibited about the same strength as that of blades from the fan of the fifth comparative example in which only glass wool is contained as the reinforcing material. This is presumably because, in the blades of the third embodiment, the glass wool contained in the composite molding material is uniformly packed up to the intricate portion of the mold when the composite molding material of the first embodiment is injection molded in the mold.

[X-Ray CT Imaging]

Figure 5:
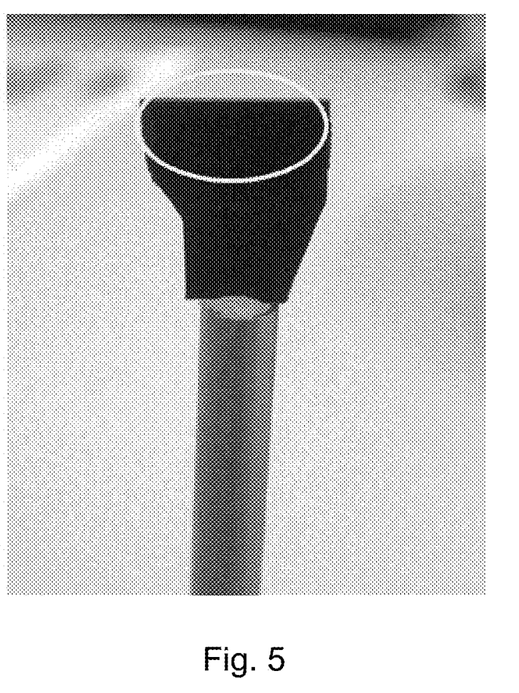
FIG. 5 is a photograph substituted for a drawing and shows a blade fixed to a sample holder for X-ray CT imaging, and the distal end portion marked by a circle in the photograph is the portion imaged by X-ray CT.

Next, X-ray CT imaging of blades of the fan produced in the third embodiment and the fourth comparative example was performed in order to check that the improvement to the strength of the blades was caused by the glass wool being packed. First, a blade cut out from the fan produced in the third embodiment was fixed, at a fan body root-side portion of the blade, to a sample holder using an adhesive. FIG. 5 shows a blade fixed to the sample holder, and the distal end portion marked with a circle was imaged. The imaging was performed through the following procedure using SkyScan 1172 Micro-CT (Bruker Micro).
(1) Scanning software "SKYSCAN-pCT" was launched, an X-ray source was aged, and a sample holder to which the blade (the measurement sample) is fixed was then fixed in a chamber.
(2) The resolution (number of pixels) of an X-ray image acquisition camera is set to Standard resolution (2000×1048 pixels), and scanning is performed by slowly rotating the holder to 180° and capturing a transmissive image every 0.6° of rotation.
(3) A tomographic image is reconstituted using software "Nrecon" from the obtained transmissive images.
(4) A transmissive 3D image is obtained from the tomographic image using CTVox 3D display software.

A blade of the fan produced in the fourth comparative example was also imaged by X-ray CT using the same procedure as that described above.

Figure 6:
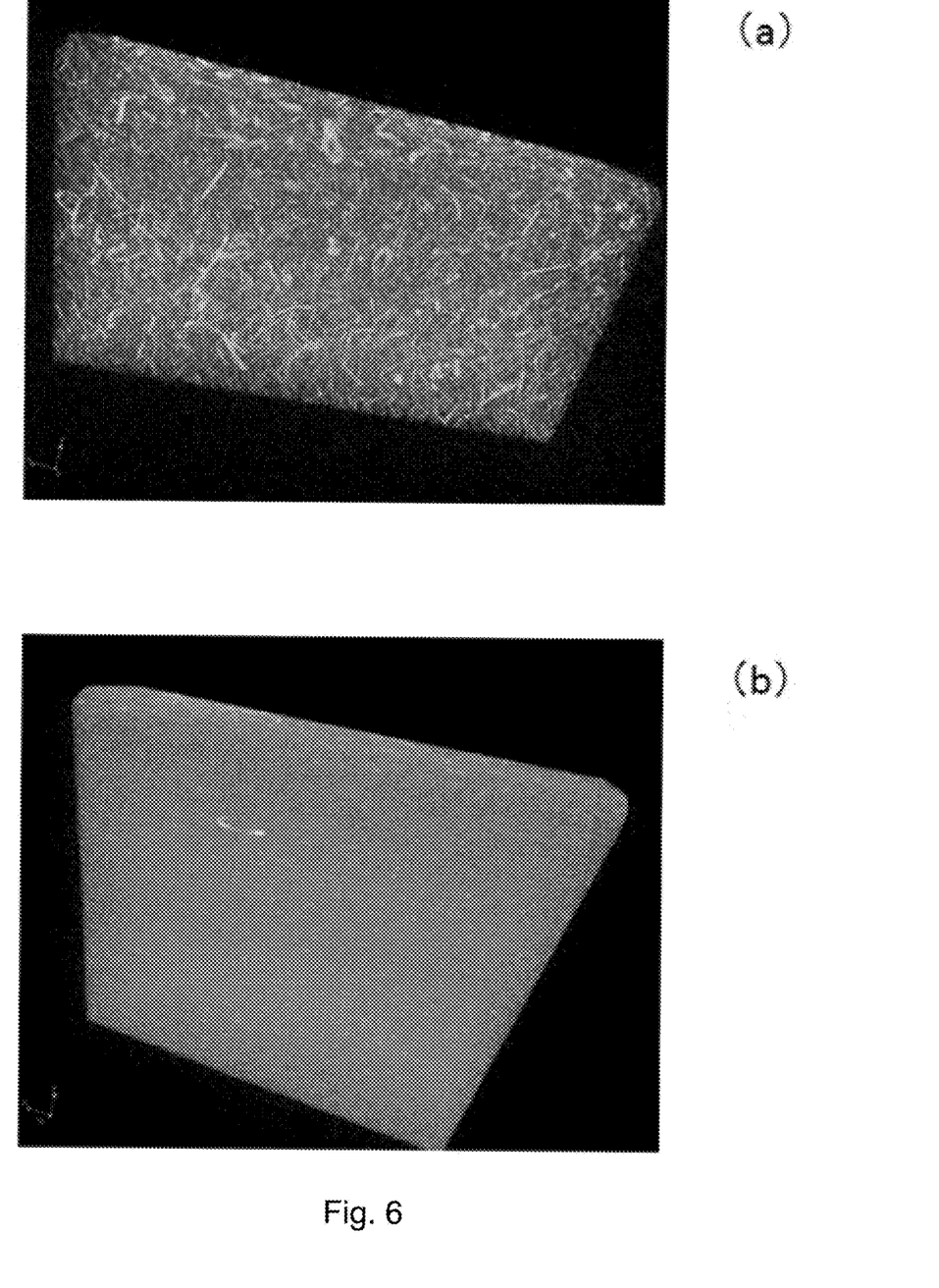
FIG. 6 is a photograph substituted for a drawing, and shows a transmissive 3D image of a blade cut out from the fan produced in (a) the third embodiment and (b) the fourth comparative example.

FIG. 6 shows a transmissive 3D image of a distal end portion of a blade cut out from the fan produced in (a) the third embodiment and (b) the fourth comparative example. As can be seen in the photograph, even at the furthermost terminal end portion of the blade (thickness of thinnest part: approximately 0.5 mm) extending from the fan, the glass wool was clearly identifiable in the blade of the third embodiment. In contrast, glass fiber was barely identifiable in the blade of the fourth comparative example.

Production and Evaluation of Semiconductor Burn-in Socket

Fourth Embodiment

Figure 7:
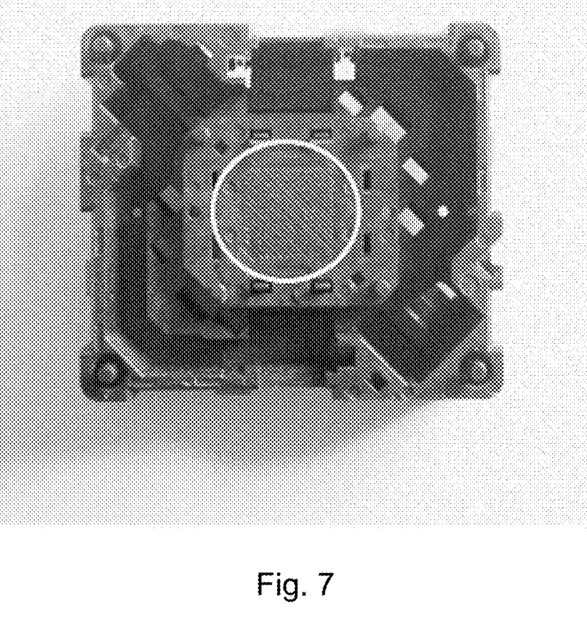
FIG. 7 is a photograph substituted for a drawing and shows a semiconductor burn-in socket obtained in the fourth embodiment, and the circled portion represents a lattice-like intricately shaped part.

The composite molding material produced in the second embodiment was injection molded into a mold for producing a semiconductor burn-in socket (may hereafter be referred to simply as "socket"). The injection molding machine used was model HXF33J8 of Ning Bo Hai Xing Plastics Machinery Manufacturing Co., Ltd). Injection molding was performed using the same procedure as that in the third embodiment, other than the temperature of the injection cylinder nozzle being set to 380° C. FIG. 7 is a photograph of the obtained socket. The circled portion is a lattice-like intricately shaped part measuring 7×7 mm and having a thickness of 2 mm. The lines constituting the lattice-like intricately shaped part had a width of approximately 0.1 mm, and the lattice cells measured 0.2×0.25 mm.

[X-Ray CT Imaging]

Figure 8:
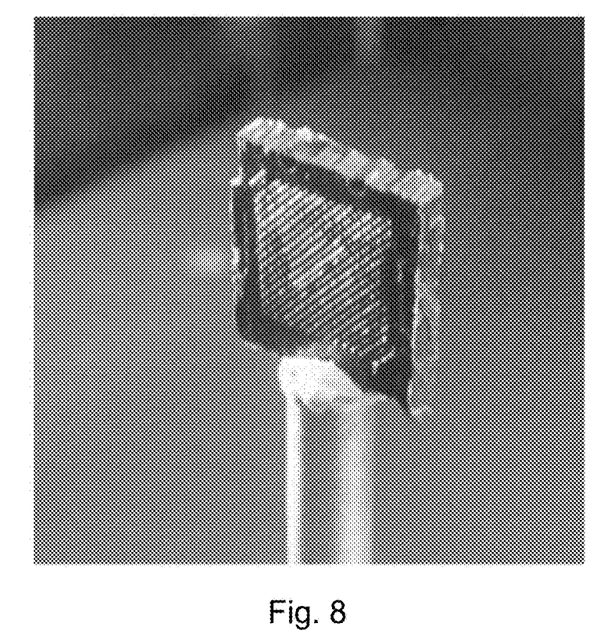
FIG. 8 is a photograph substituted for a drawing and shows a state in which the lattice-like portion of the semiconductor burn-in socket obtained in the fourth embodiment is fixed to a sample holder.

Next, the lattice-like portion at the center of the socket produced in the fourth embodiment was cut out and fixed to a sample holder using an adhesive. FIG. 8 shows the lattice-like portion fixed to the sample holder. The imaging was performed using the same procedure as that in the third embodiment, and a transmissive 3D image of a section measuring 2×2 mm at substantially the center of the lattice-like portion was obtained.

Sixth Comparative Example

Using the composite molding material of the third comparative example, a socket was injection-molded using the same procedure as that in the fourth comparative example other than the temperature of the injection cylinder nozzle being set to 380° C., X-ray CT imaging was performed using the same procedure as that for the third embodiment, and a transmissive 3D image of a section measuring 2×2 mm at substantially the center of the lattice-like portion was obtained.

Figure 9:
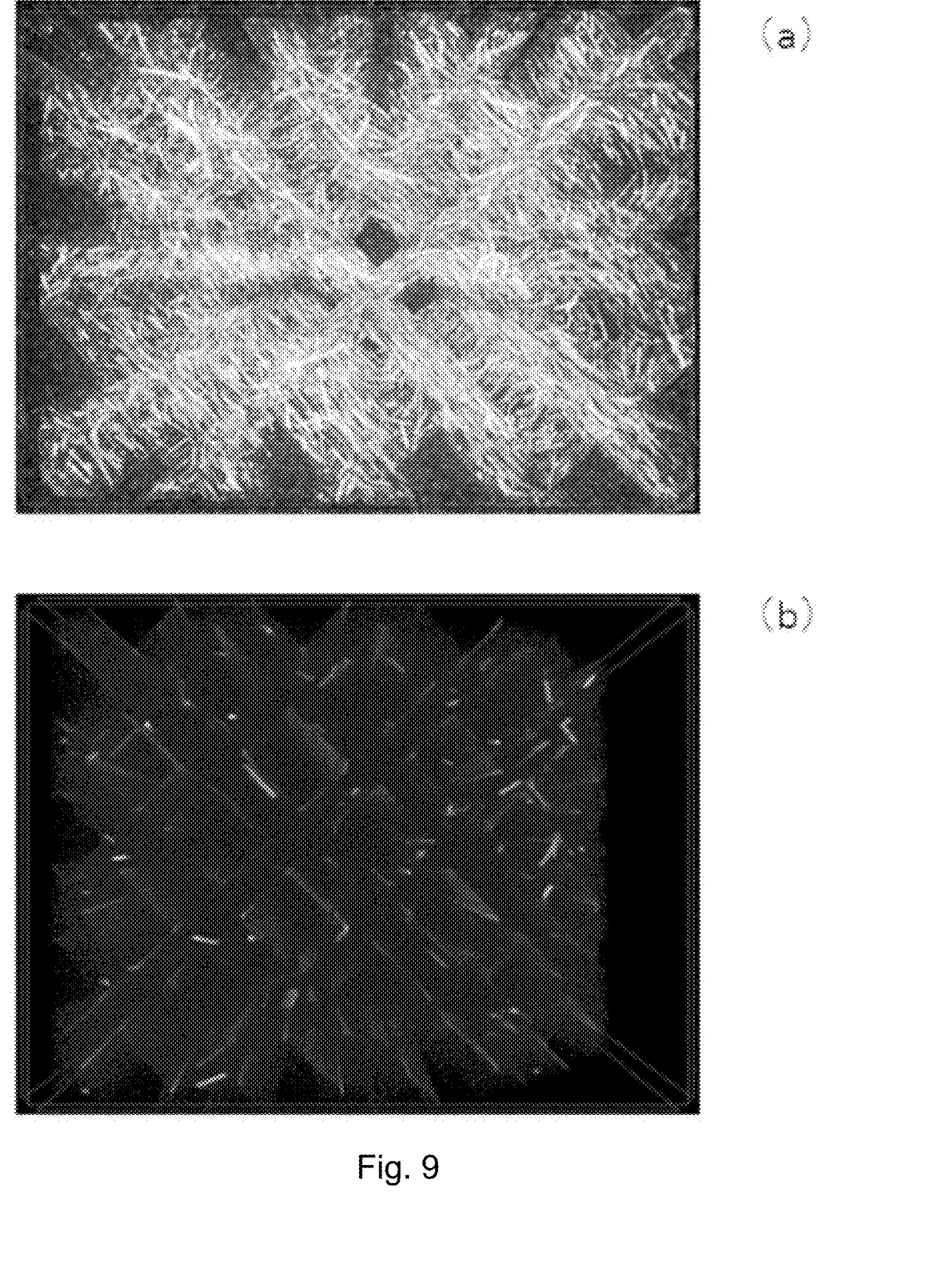
FIG. 9 is a photograph substituted for a drawing and shows a transmissive 3D image of the lattice-like portion of a semiconductor burn-in socket obtained in (a) the fourth embodiment and (b) the sixth comparative example.

FIG. 9 is a photograph of the transmissive 3D image obtained in (a) the fourth embodiment and (b) the sixth comparative example. As can be seen from the photographs, it can be clearly identified that glass wool was packed to the center of the lattice-like portion in the socket of the fourth embodiment. In contrast, in the socket of the sixth comparative example, only a slight amount of glass fiber pieces, thought to have been cut and made finer during kneading and/or injection molding, can be identified, and the lattice-like portion was not sufficiently packed with glass fiber.

As can be seen from the above embodiments and comparative examples, when the composite molding material of the present invention is used to manufacture an injection-molded article, the reinforcing material having a smaller average fiber diameter contained in the composite molding material can be uniformly packed in the intricately shaped part of the injection-molded article while maintaining the strength of the injection-molded article itself, making it possible to improve the strength of the injection-molded article and the intricately shaped part. In addition, producing an injection-molded article using the composite molding material of the present invention results in reduced fluctuation in strength between individual products and/or according to location in a product, making it possible to reduce the number of defective products and improve yield.

Producing an injection-molded article using the composite molding material of the present invention in which two or more reinforcing materials are kneaded into a thermoplastic resin makes it possible to pack the reinforcing material having a smaller average fiber diameter into an intricately shaped part of the injection-molded article, and results in an injection-molded article having a strength substantially identical to that of an injection-molded article injection-molded using a composite molding material containing only a reinforcing material having a greater average fiber diameter. Therefore, the present invention can be applied to an injection-molded article including an intricately shaped part.

What is claimed is:

1. A composite molding material comprising a thermoplastic resin and reinforcing materials; wherein,
the reinforcing materials consist of only glass wool having an average fiber diameter of 1-7 μm and a prekneading fiber length of 300-1000 μm and a fibrous reinforcing material having an average fiber diameter of 7-20 μm,
the glass wool and the fibrous reinforcing material are dispersed in the thermoplastic resin.

2. The composite molding material according to claim 1, wherein the fibrous reinforcing material having an average fiber diameter of 7-20 μm is glass fiber.

3. The composite molding material according to claim 1, wherein the glass wool has been surface-treated with at least one agent selected from silane coupling agents, lubricants, and coating-forming materials.

4. The composite molding material according to claim 2, wherein the glass wool has been surface-treated with at least one agent selected from silane coupling agents, lubricants, and coating-forming materials.

5. The composite molding material according to claim 2, wherein the glass fiber has been surface-treated with at least one agent selected from silane coupling agents, lubricants, and coating-forming materials.

6. The composite molding material according to claim 4, wherein the glass fiber has been surface-treated with at least one agent selected from silane coupling agents, lubricants, and coating-forming materials.

7. The composite molding material according to claim 1 wherein the composite molding material is one used for injection molding.

8. The composite molding material according to claim 2 wherein the composite molding material is one used for injection molding.

9. An injection-molded article produced by injection molding the composite molding material according to claim 1.

10. An injection-molded article produced by injection molding the composite molding material according to claim 2.

11. A method for manufacturing a composite molding material comprising a thermoplastic resin and reinforcing materials; wherein,
the reinforcing materials consist of only glass wool having an average fiber diameter of 1-7 μm and a prekneading fiber length of 300-1000 μm and a fibrous reinforcing material having an average fiber diameter of 7-20 μm,
among the reinforcing materials, at least the glass wool is heated to a temperature that falls within the range of a temperature lower by 150° C. to a temperature higher by 50° C. than the temperature of the melted thermoplastic resin, and is then introduced into the melted thermoplastic resin.

12. The method for manufacturing a composite molding material according to claim 11, wherein the reinforcing material having an average fiber diameter of 7-20 μm is glass fiber.

13. A pellet comprising the composite molding material according to claim 1.

14. The injection-molded article according to claim 9, wherein the injection-molded article comprises structural portions of different sizes, the glass wool is capable of being dispersed into the structural portions which are of such small sizes that the fibrous reinforcing material having an average fiber diameter of 7-20 μm is incapable of being dispersed into the structural portions.

15. The injection-molded article according to claim 10, wherein the injection-molded article comprises structural portions of different sizes, the glass wool is capable of being dispersed into the structural portions which are of such small sizes that the fibrous reinforcing material having an average fiber diameter of 7-20 μm is incapable of being dispersed into the structural portions.

* * * * *